Patented July 5, 1938

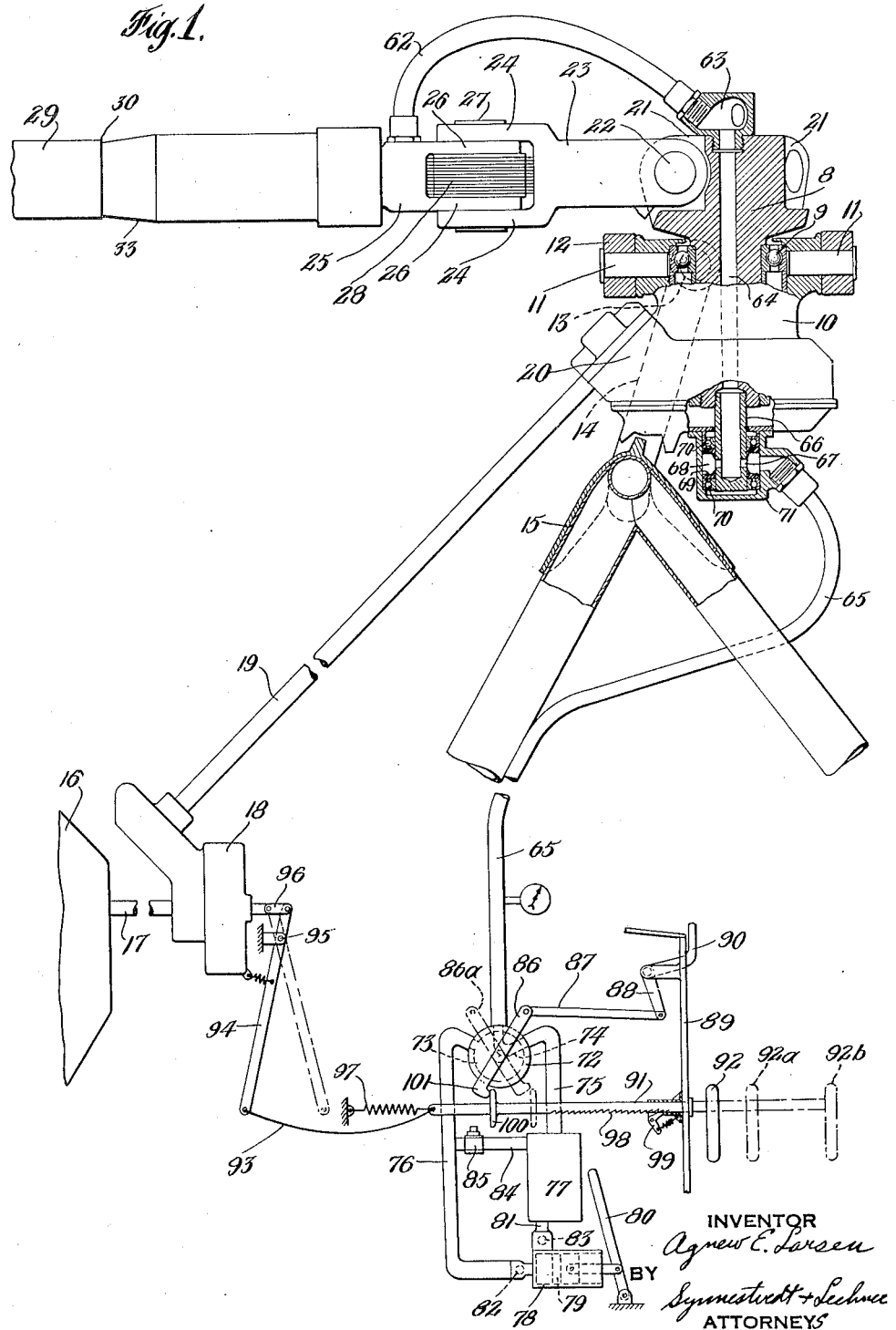

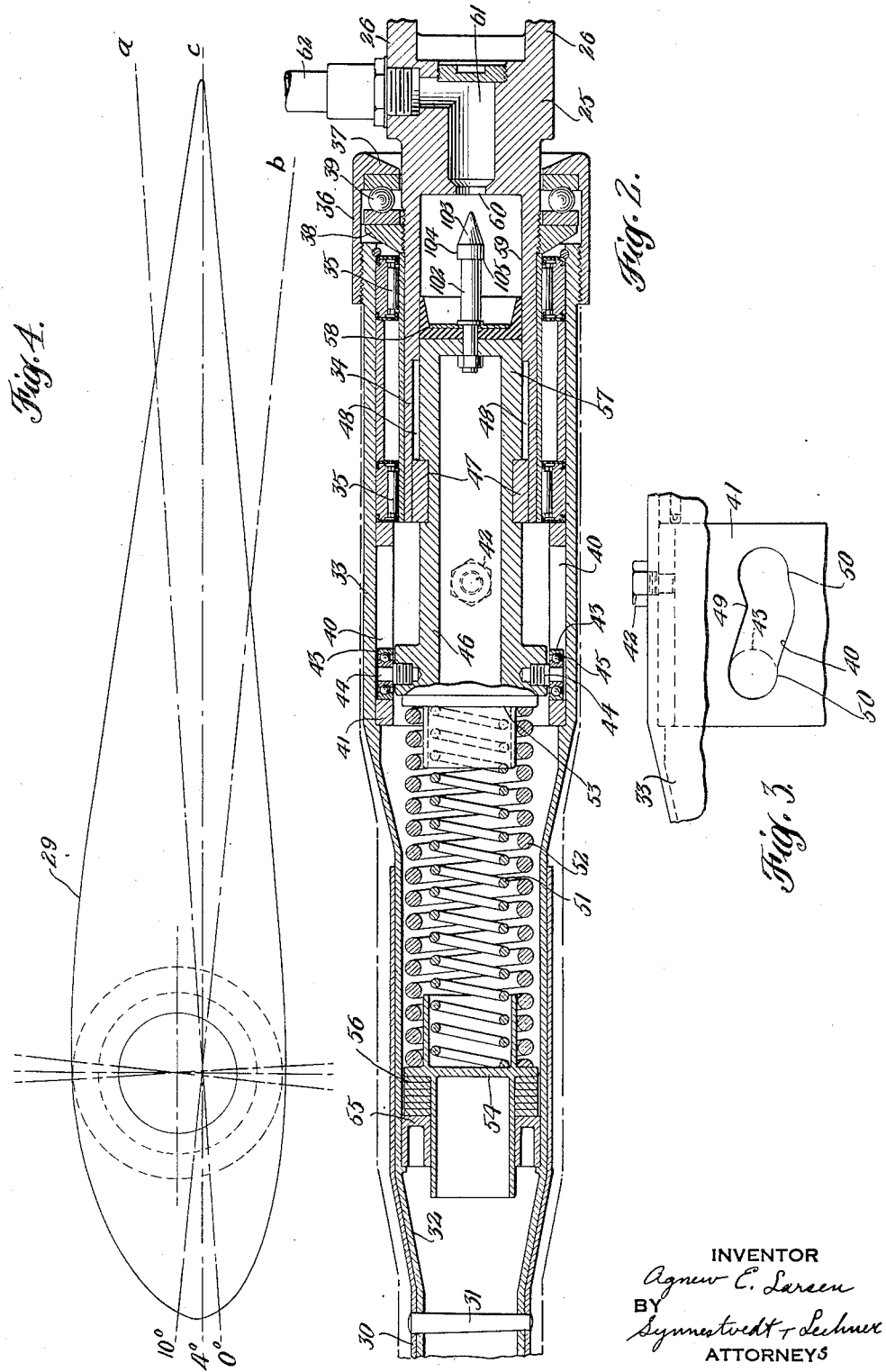

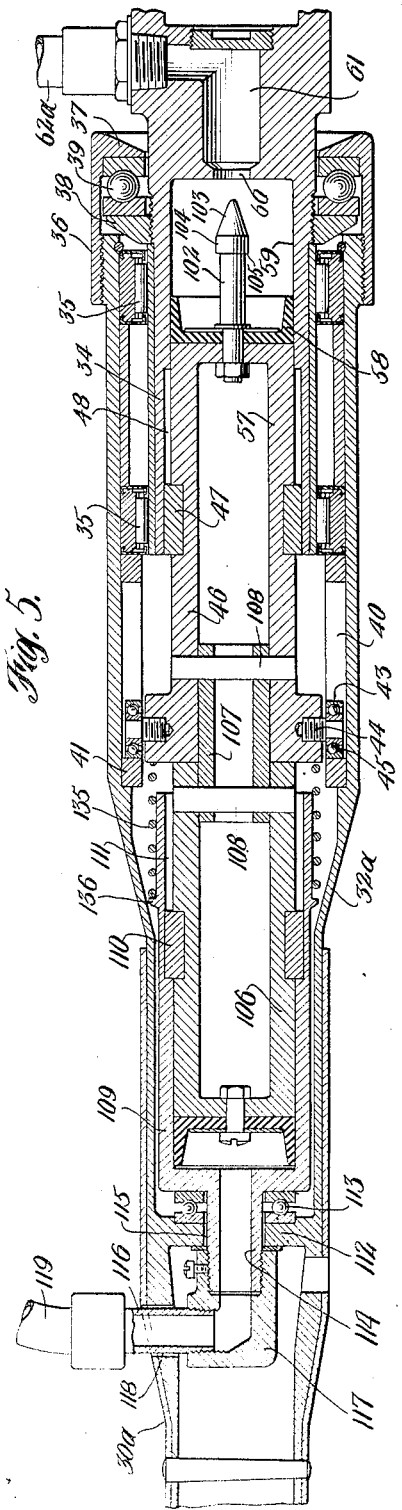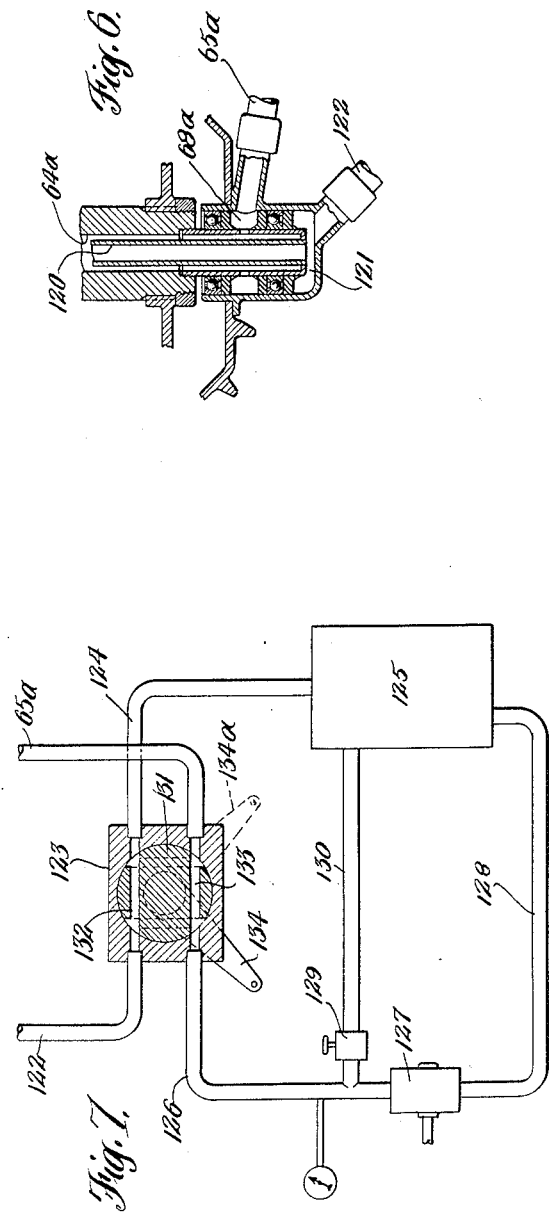

2,122,428

UNITED STATES PATENT OFFICE 2,122,428

ROTARY-WINGED AIRCRAFT

Agnew E. Larsen, Jenkintown, Pa., assignor to Autogiro Company of America, Willow Grove, Pa., a corporation of Delaware Application June 26, 1937, Serial No. 150,479

25 Claims. (Cl. 244—18)

This invention relates to rotary-winged aircraft, especially a craft of this type in which the rotor is adapted to be autorotationally actuated in normal flight but in which provision is made for pitch change movements of the wings or blades.

The invention is more particularly concerned with the provision of means providing for pitch change movement of the rotative sustaining blades between a position affording substantially zero lift and a pitch position substantially higher than the normal value for autorotational flight. Still further, the invention has reference to blade mounting and controlling mechanism providing for substantially zero pitch setting of the blades when they are being driven in preparation for take-off, and for increase of pitch to a value greater than the normal autorotational value to effect "jump" or direct take-off of the craft with the rotor rotating at higher than normal R. P. M. in order to utilize kinetic energy stored in the blades to produce a high initial lift.

In accordance with this invention means are also provided for returning the blades to substantially normal autorotational pitch toward or at the end of the direct take-off maneuver.

It is an object of the invention to provide a mechanism capable of performing the functions above noted, which mechanism is positive in its action, i. e., provides for positive movement of the blade to different pitch positions independently and without interfering with the action of swinging movements of the blades to accommodate differential lift and other flight forces, which swinging movements are provided for by means of pivotal or articular mountings for the blades in addition to the mounting provided for pitch change movement.

It is a further object of the invention to provide means ensuring positioning of the blades at substantially normal autorotational incidence or pitch during normal flight.

More specifically, the invention contemplates the mounting of each blade for pitch change movement substantially about its longitudinal axis and for the use of a cam and cam follower, preferably associated directly with the blade root, the cam being configured so that upon relative movement of the cam and follower in one direction, the blade is caused to change its pitch, first in a positive sense and then in a negative sense. In the preferred form of construction the cam and follower are arranged so that in one limit of the relative movement thereof the blade assumes substantially zero pitch, in an intermediate portion of the movement the blade assumes a higher than normal autorotational pitch for direct take-off, and in the other limit of movement the blade assumes substantially normal autorotational pitch.

In accordance with another aspect of the invention automatic timing means are provided for the movement of the cam and cam follower, the timing mechanism preferably being arranged to give a rapid pitch change movement from the substantially zero position up to the direct take-off pitch setting and then a relatively slow movement while the cam and follower are relatively moving within the range corresponding to direct take-off pitch. In addition the invention also contemplates a relatively rapid pitch change movement, controlled by the timing device, from the direct take-off pitch back to the substantially normal autorotational value.

Other features of importance include the provision of a novel control system for pitch change movements of the blades, the control system preferably being of the hydraulic type and being interrelated to the operation of other control organs for the craft, such, for example, as a clutch providing for connection and disconnection of the rotor drive. Desirably also the operation of the controls are all interrelated so as to provide for a predetermined sequence of events in effecting the direct take-off maneuver.

How the foregoing, together with other objects and advantages, are attained will be more apparent from a consideration of the following description referring to the accompanying drawings, in which—

Figure 1 is a fragmentary side elevational view, with parts shown in vertical section, of a rotor hub or head structure including a portion of one blade mounted thereon, this view also including a somewhat diagrammatic layout of the controlling system for various elements hereinbefore previously mentioned and described in detail herebelow.

Figure 2 is a longitudinal vertical sectional view through the root end portion of a rotor blade mounted in accordance with this invention.

Figure 3 is a detail view showing certain cam parts of the arrangement illustrated in Figure 2.

Figure 4 is a diagrammatic sectional outline of a blade, with various pitch angles indicated thereon.

Figure 5 is a view similar to Figure 2 but illustrating a modified construction.

Figure 6 is a vertical sectional view of certain hub details employed when using the arrangement of Figure 5, and Figure 7 is a somewhat diagrammatic layout of a control system for the arrangement of Figure 5.

Referring, first, to Figure 1, the rotor hub proper is shown at 8 as being journaled by means of one or more bearings 9 within the hub casing 10, which casing is tiltably mounted as by means of the trunnions 11—11, providing for lateral tilting, the trunnions being carried by the gimbal ring 12. The ring, in turn, is supported by means of transverse trunnions, one of which appears at 13 at the upper ends of a pair of fork prongs 14 extended upwardly from the fixed supporting elements 15 and embracing the external hub part 10.

By virtue of the mounting of the hub just described, the hub is tiltable both fore and aft and laterally, this being provided for control purposes in flight in accordance with the disclosure of copending application Serial No. 645,985 of Juan de la Cierva, filed December 6, 1932.

The hub member 8 may be driven from the propulsion engine 16 for the craft, an extension shaft 17 delivering torque from the engine to the gear and clutch unit 18 which, in turn, transmits torque through shaft 19 to suitable gears mounted within the casing 20 forming a part of the hub support 10.

A plurality of blades or wings are pivotally connected to the hub member 8 as by means of pairs of apertured lugs 21 and "flapping" pivots 22, the latter also cooperating with extension links 23 each of which is provided with vertically spaced and apertured ears 24—24. At the root end of the blade a fitting 25 is provided, this fitting having additional vertically spaced and apertured ears 26—26 received between the ears 24—24 and connected thereto by means of a "drag" pivot 27. A device generally indicated at 28 may be employed to control drag movements of the blade about the pivot 27. This device, however, forms no part of the present invention per se, being described and claimed in my copending application Serial No. 106,343, filed October 19, 1936.

The blade shown at 29 in Figure 1 is mounted on the fitting 25 by means of the structure shown in vertical section in Figure 2. As clearly seen in this view, the blade spar 30 (or an element connected therewith) is fastened as by pins or the like, 31 to a special fitting 32 which extends inwardly and is enlarged as at 33 to receive internal mounting parts, including a radial extension 34 of the fitting 25. Interposed between the elements 33 and 34 are one or more needle roller bearings 35 providing for rotation of the blade substantially about its longitudinal axis with respect to the mounting part 34 and thus for pitch change movement of the blade on the hub. The thrust of centrifugal force may be taken by means of the member 36 threaded onto the inner end of the blade fitting 33 and provided with an internal flange 37 between which and the cooperating ring 38 a thrust bearing 39 is interposed. Ring 38 is threaded onto the internal member 34 so that the thrust is thereby delivered to the blade mounting fitting 25 and from there to the hub through the drag and flapping pivots.

Movement of the blade substantially about its longitudinal axis is controlled by a cam and follower device, preferably including a pair of diametrically opposed cam slots 40—40 formed in the sleeve 41, which sleeve is fitted inside the blade root mounting member 33 and is rigidly secured as against rotation therein as by means of bolts 42. The parts just described also appear in the fragmentary detailed view of Figure 3, also showing the shape of the cam slots. The cam followers preferably take the form of rollers 43 mounted on pins 44 by means of anti-friction bearings 45. The pins in turn are secured to the internal member 46 which is longitudinally movable substantially along the blade axis and retained as against rotation by means of key elements 47 working in key slots 48 formed internally of the mounting part 34.

The structural features just described provide for blade pitch change upon axial movement of the member 46.

Referring, again, to the shape of the cam slots, it is pointed out that when the roller 43 is positioned at one end of the slot (the left end as viewed in Figures 2 and 3) the blade takes a position of substantially zero pitch as indicated by the dot and dash line a in Figure 4, i. e., a position in which the blade has zero lift. In an intermediate range of movement of the roller in the slot, as at 49 in Figure 3, the blade assumes a higher than normal autorotational pitch, for example, 10°, as shown by the line b in Figure 4. Toward the other end of its movement in the cam slot the roller 43 provides for a pitch equivalent to the normal autorotational setting for the particular rotor, for example, 4° as shown by line c in Figure 4. Toward both ends of the cam slot, a short terminal portion thereof, as at 50 (see Figure 3) is shaped so that torque moments on the blade will have no tendency to move the roller in the slot.

For the purpose of moving the member 46 to the right as viewed in Figure 2, i. e., into the position corresponding to substantially normal auto rotational pitch (line c on Figure 4) a pair of springs 51 and 52 are employed, these springs reacting between an end fitting 53 of member 46 and an abutment 54 mounted radially outwardly in the blade root. The member 54 delivers the spring force to the ring 55 which is fastened internally of the root fitting 32. One or more washers 56 may be interposed between member 54 and ring 55 in order to adjust the pressure exerted by the springs. Preferably the strength of each of the springs alone is sufficient to retain the member 46 in the position corresponding to normal autorotational pitch, and preferably also the strength of only one of these springs (52 in the embodiment illustrated) is of sufficient strength to move member 46 and the associated parts to cause the blade, in turn, to move from zero pitch position to direct take-off pitch and from there back to the normal autorotational setting. These features are of importance as safeguards since, in the event of failure of either spring in normal flight, the remaining spring is adequate to retain the blade at the desired normal autorotational pitch setting. Similarly, a safety factor is present in the event of failure of the larger or stronger spring, in which case, if the member 46 is moved to the left when viewed as in Figure 2 in order to reduce the pitch to zero preparatory to overspeeding the rotor for direct take-off, the remaining spring (51) is of insufficient strength to move the blade to the direct take-off pitch. Direct take-off would, therefore, not be accomplished and the pilot would be apprised of the failure of the main return spring.

Movement of the member 46 from the left-hand position to the right-hand position when viewed as in Figure 2 (corresponding to blade pitch change from zero to higher than normal and then to normal autorotational pitch) is controlled and timed by a mechanism described herebelow, including a hydraulic piston and cylinder device which also serves to effect movement of the member 46 in the opposite direction. The piston just mentioned comprises an extension 57 formed on member 46 and provided with a packing cup 58, the piston being movable in cylinder 59 to which fluid pressure is delivered through orifice 60 providing communication with passage 61 in the fitting 25. This passage is, in turn, connected by means of flexible tubing 62 (see Figure 1) with a chamber 63 at the top of the rotative hub member 8. The chamber 63 in turn is supplied with fluid pressure through the central passage 64 extending downwardly through the hub and communicating at its lower end with pipe 65 which extends downwardly into the body of the craft for supply and control in the manner set out herebelow. At the bottom of the hub a rotative pressure connection is provided between passage 64 and pipe 65, this connection including a central tube 66 rotative with the hub 8 having ports 67 communicating with annular chamber 68 defined by automatically sealing packing rings 69 adjacent to the bearings 70 mounted within the housing 71. The bearings provide for free rotation of the central tube 66 and the pipe 65 communicates with the annular chamber 68. The pressure employed in the system thus serves to tighten the packing rings 69 and prevent fluid and pressure loss.

Fluid pressure may be supplied to pipe 65 through a valve comprising a casing 72 and a valve rotor 73, the latter having an approximately right-angled passage 74 therein, with its ends positioned to cooperate alternatively with pipe 65 and pipe 75 or pipe 65 and pipe 76, depending upon the position of the rotary valve. Pipe 75 communicates with the fluid (preferably oil) supply or reservoir 77 and pipe 76 is extended to communicate with cylinder 78 having pump piston 79 therein operable by means of lever 80. The cylinder 78 is also placed in communication with the reservoir 77 through connection 81. Pipe 76 is provided with a check valve 82 arranged to prevent flow from the pipe into the cylinder 78. Connection 81 is equipped with a check valve 83 for restricting flow from the cylinder into the reservoir 77. Thus, upon operation of the pump handle 80, fluid is admitted to the cylinder 78 from reservoir 77 and pressure built up in the pipe 76 and, with the rotary valve 73 in proper position, the pressure is delivered upwardly to and through the rotor hub and from there to the incidence controlling cylinder 59 in the blade root. A by-pass 84 with a relief valve 85 interconnects pipe 76 and reservoir 77.

The position of valve 73 is controlled by means of lever 86 connected by link 87 to one arm 88 of a bell crank pivotally mounted on a suitable panel or the like 89, with the other arm 90 thereof projecting through the panel for the purpose of actuating the valve.

Upon pulling the handle 90 outwardly and downwardly the valve 73 is caused to move into the position indicated by the dot and dash showing 86a of the lever 86, in which position pipe 65 is connected with pipe 76. In the full line position of Figure 1 pipe 65 is connected with pipe 75.

Control of this valve is also preferably in part secured by an interlock with the clutch operating element 91 mounted in panel 89 and having a handle 92. The operating element 91 is connected by means of a cable or the like 93 with the lower end of clutch operating lever 94, pivoted to a fixed part as at 95 and linked to a clutch controlling member as at 96. Thus, upon drawing the handle 92 outwardly the clutch is engaged and the rotor driven by delivery of torque from the engine 16 upwardly to the rotor hub through the shaft 19. In the full line position of Figure 1 it will be noted that the cable connection 93 is slack, so that the clutch will not be engaged until after a certain predetermined initial outward movement of handle 92 to the extent indicated at 92a. Spring 97 serves to draw the clutch operating element 91 inwardly and thus to release the clutch, the handle 92 being turned, when it is desired to release the clutch, in order to disengage the teeth 98 from the pawl 99.

The clutch operating element 91 also carries an abutment 100 adapted to cooperate with a downward extension 101 of the valve operating lever 86.

Tracing the operation of the control and pitch change mechanisms, first assume that the parts are in the full line positions shown in Figure 1. The clutch operating handle 92 is at this time in full release position, in which position the valve 73 places pipes 65 and 75 in communication. This relieves pressure in the system as to which the pipe 65 is extended so that the return springs 51 and 52 (see Figure 2) will move member 46 to the right, thus ensuring blade pitch at the normal autorotational value.

When it is desired to effect the direct take-off maneuver, the clutch handle 92 is first drawn outwardly to the position indicated at 92a and then handle 90 of the valve control is drawn outwardly and downwardly to place pipe 65 into communication with pipe 76. The pump 80 is now actuated to transmit fluid pressure upwardly through pipe 65 and into the cylinder 59 for each blade, the build-up of pressure in cylinder 59 causing piston 57 and member 46 to move to the left. This, in turn, causes the blade to move to the zero pitch position. Rotation of the rotor is now effected by drawing the clutch handle 92 outwardly to the position shown at 92b (i. e., a position in which the clutch is engaged) and the rotor is preferably overspeeded to a considerable degree.

When the desired rate of R. P. M. has been attained the clutch handle 92 is turned to release the pawl 99 and the return spring 97 will then draw the operating element 91 inwardly, releasing the clutch, and in the inner part of the stroke, turning valve 73 by abutment of the part 100 against the extension 101 of the operating lever 86 to the position in which pipe 65 is placed in communication with pipe 75 (the full line position of Figure 1). As a result of this the pressure in the cylinder 59 for each blade is relieved and the return springs 51 and 52 move the member 46 and piston 57 to the right when viewed as in Figure 2, thus increasing the blade pitch to the direct take-off value and from there to the normal autorotational value.

For the purpose of controlling the rate of pitch change from zero pitch up to direct take-off pitch and then back to normal autorotational pitch, a metering pin 102 is mounted in the head of piston 57 in position to project into the cylinder 59 in alignment with the orifice 60. As the piston moves to the right the metering pin enters the orifice 60 and restricts exhaust of fluid from cylinder 59 so as to retard movement of the piston in the right-hand direction. Special attention is called to the configuration of the head of the metering pin, this head including a tapered part 103, a substantially circular part 104 and a shoulder 105 forming an abrupt break between the head of the pin and the pin proper 102. In consequence of this configuration and also in consequence of the relative position of the head of the pin with respect to the orifice 60, the initial portion of movement of the blade from zero pitch toward direct take-off pitch takes place very rapidly (the orifice 60 being unrestricted). As the tapered part 103 of the head enters the orifice 60 the movement progressively decreases in speed and is at a minimum during passage of the circular part 104 through the orifice 60. The part 104 is so positioned as to correspond to the highest pitch part 49 of the cam slot 40 (see Figure 3), with the result that during movement in the range of highest pitch for direct take-off the rate of movement is relatively very slow. As soon, however, as the shoulder 105 passes through the orifice 60, the exhaust from cylinder 59 again increases in speed so that the blade is relatively quickly brought back to substantially normal autorotational pitch.

In considering the foregoing, it should be borne in mind that the entire elapsed time from the beginning of the movement of piston 57 to the right to the end of this stroke is a matter of a few seconds, for example, from 2 to 4 or 5 seconds.

The foregoing mechanism thus provides for direct take-off by the storing of kinetic energy in the rotor and the utilizing of that energy with the blades set at a high pitch in order to develop a high degree of lift for the initial jump. The metering device controlling exhaust of fluid from cylinder 59 and the pressure of springs 51 and 52 are relatively arranged so that as the rotor slows down toward the end of the direct take-off maneuver to a rotational speed approximating the normal autorotational rate, the blades are moved to the substantially normal autorotational pitch and maintained in this position by means of the springs during the subsequent flight maneuvers, and landing.

It is especially to be noted that the arrangement provides positive and automatic control of blade pitch to the over-pitch position and then back to normal autorotational flight pitch, independently of the flight hinges for the blade, in view of which the choice of angles and locations of the flight hinges may be based solely on the conditions desired in normal autorotational flight.

The cam arrangement providing and controlling pitch change including over-pitching, is highly advantageous because of its simplicity, sturdiness and positive action, and also since it does not rely on any variable forces for its operation.

In the arrangement of Figures 5, 6 and 7 many parts of the blade mounting are essentially the same as those described above, particularly in connection with Figure 2. The primary feature of modification in the second form is the substitution of a hydraulic device for moving the member 46 and piston 57 to the right, i. e., in the direction causing blade pitch change from zero to direct take-off and thence to the normal autorotational value, this hydraulic device taking the place of the return springs 51 and 52 of Figure 2.

For this purpose a piston 106 is secured to the left end of member 46 as by means of sleeve 107 and pins 108. The piston works in a cylinder 109 and is restrained as against rotation in the cylinder by means of keys 110 working in slots 111 similar to the parts 47 and 48 described above in connection with Figure 2. Just beyond the left end of cylinder 109 the blade root member 32a is provided with a centrally apertured web 112 between which and the cylinder head a bearing 113 is interposed to ensure free rotation of the cylinder and piston with its associated parts with respect to the blade proper during change of pitch. The cylinder head is provided with a fluid tube 114 projecting therefrom and through the aperture in web 112, with clearance as at 115 permitting freedom for flexure of the blade with respect to the internal operating parts. Pipe 116 is connected to the tube 114 by means of an elbow 117, the pipe 116 passing through suitable apertures formed in the blade root fitting 32a and the blade attachment part 30a, clearance at 118 again being provided to accommodate weaving resulting from flexure of the blade. The flexible tube 119 connected with pipe 116 is extended inwardly to a chamber in the top of the rotor hub communicating with a central tube 120 (see Figure 6) arranged within the passage 64a and communicating at its lower end with a chamber 121 connected by means of pipe 122 with a valve device 123 described below.

At this point attention is called to Figure 6 in comparison with Figure 1, and it is noted that in Figure 6, as in Figure 1, the passage 64a communicates with an annular chamber 68a which, in turn, communicates with pipe 65a. It will also be understood that the passage 64a is in communication with the flexible tube 62a at the top of the hub, which flexible tube transmits fluid pressure through passage 61 into cylinder 59, which parts are the same as those described above in connection with Figure 2 and serve the purpose of moving the piston 57 and the associated parts to the left so as to reduce the blade pitch to zero.

In the form of Figures 5, 6 and 7, pipe 65a also extends downwardly into the body of the craft to be associated with the valve device 123 shown in Figure 7. This valve device is further provided with a pipe 124 communicating with reservoir 125 and a pipe 126 communicating with pump 127 preferably of the motor operated type. The pump is connected with the reservoir by a pipe 128. A pressure relief valve 129 and by-pass 130 interconnect pipe 126 and the reservoir.

The valve rotor 131 has two passages 132 and 133 adapted, in the full line position shown in Figure 7, to interconnect pipes 122 and 124 and pipes 126 and 65a, respectively. The valve rotor may be actuated by a lever 134 in the dotted line position 134a of which, passage 132 interconnects pipes 122 and 126 and passage 133 interconnects pipes 65a and 124.

In the operation of this control system, when it is desired to effect the direct take-off maneuver, the operating element 134 for the valve is moved to the position shown in full lines in Figure 7 so that the pump builds up pressure which is transmitted through pipe 126 to pipe 65a and from there upwardly through the hub and to the cylinder 59, thereby causing displacement of piston 57 to the left and change of blade pitch to the zero value. The rotor is now driven as by actuating a clutch control of the type illustrated in Figure 1, and upon the attainment of the desired rate of R. P. M. the clutch is released and the actuating element 134 for the valve 131 moved to the position indicated in dotted lines at 134a. The fluid pressure now is transmitted through valve 123 to pipe 122 which communicates with the central tube 120 extending upwardly through the rotor hub and with the flexible tube 119 extending to the outer cylinder 109, and pressure in this cylinder moves the piston 106 and the member 46 to the right, thus causing blade pitch change from the zero value upwardly to the direct take-off setting and from there back to the normal autorotational value. The metering pin 102 again serves to control the movement of the parts in this direction and cylinder 59 is, at this time, connected with the reservoir 125 through flexible tube 62a, passage 64a, pipe 65a, passage 133 in the valve and pipe 124.

The operating element 134 for the valve is normally retained in the dotted line position 134a during flight, and, in addition, a return spring 135 reacting between member 46 and a suitable abutment 136 formed on cylinder 109 also serves to retain the parts in the right-hand position when viewed as in Figure 5 so as to maintain the blade at normal autorotational incidence. Preferably the spring 135 has sufficient strength to maintain the normal autorotational pitch setting even in the event of failure of the pump 127 or any other part of the hydraulic system.

The arrangement of Figures 5, 6 and 7 attains the same advantages as those referred to above. This second form, however, employing a hydraulic cylinder and piston device for the movement of the parts to effect blade pitch change from zero to over-pitch and to normal pitch, affords a substantially uniform returning force during the pitch change movements just mentioned.

A further advantage of the arrangement of Figures 5 to 7 inclusive is that a uniform force is applied to each of the several blades of the rotor, thus positively assuring simultaneous movement of all blades from the zero pitch position to over-pitch position and to the normal autorotational value.

I claim:

1. Mechanism for mounting an autorotationally actuable sustaining rotor blade including a pair of mounting parts relatively rotatable substantially about the longitudinal axis of the blade, a non-rotative member movable generally axially of the blade, cam and cam follower elements, one connected with the blade and the other with said member, and means for moving said member generally axially of the blade to effect pitch change movement thereof through the medium of the cooperating cam and cam follower, the cam and cam follower having a position toward one end of the relative movement thereof in which the blade is at substantially normal autorotational pitch, and means normally urging said member toward said position.

2. Mechanism for mounting an autorotationally actuable sustaining rotor blade including a pair of mounting parts relatively rotatable substantially about the longitudinal axis of the blade, a non-rotative member movable generally axially of the blade, cam and cam follower elements, one connected with the blade and the other with said member, and means for moving said member generally axially of the blade to effect pitch change movement thereof through the medium of the cooperating cam and cam follower.

3. In combination with an autorotatable sustaining rotor blade, mounting mechanism for the blade providing freedom for pitch change movement thereof, and controlling means for pitch change movement including cam and cam follower elements providing, upon relative movement thereof in one direction, for pitch change movement from a position of substantially zero pitch to a direct take-off pitch position greater than the substantially normal autorotational value, and then to a position corresponding to said autorotational value.

4. In combination with an autorotatable sustaining rotor blade, mounting mechanism for the blade providing freedom for pitch change movement thereof, controlling means for pitch change movement including cam and cam follower elements providing, upon relative movement thereof in one direction, for pitch change movement from a position of substantially zero pitch to a direct take-off pitch position greater than the substantially normal autorotational value, and then to a position corresponding to said autorotational value, means for overspeeding the rotor and timing means controlling relative movement of the cam and follower elements as aforesaid and providing relatively slow movement thereof during the portion of relative movement corresponding to direct take-off pitch.

5. In combination with an autorotatable sustaining rotor blade, mounting mechanism for the blade providing freedom for pitch change movement thereof, controlling means for pitch change movement including cam and cam follower elements providing, upon relative movement thereof in one direction, for pitch change movement from a position of substantially zero pitch to a direct take-off pitch position greater than the substantially normal autorotational value, and then to a position corresponding to said autorotational value, and the controlling means further including means normally urging the cam and follower elements toward the position corresponding to substantially normal autorotational pitch.

6. In combination with an autorotatable sustaining rotor blade, mounting mechanism for the blade providing freedom for pitch change movement thereof, controlling means for pitch change movement including cam and cam follower elements providing, upon relative movement thereof in one direction, for pitch change movement from a position of substantially zero pitch to a direct take-off pitch position greater than the substantially normal autorotational value, and then to a position corresponding to said autorotational value, means for driving the rotor including a control organ for connecting and disconnecting the drive, and means interrelating the operation of said organ and the cam device and providing for relative movement of the cam and follower elements from the zero pitch position through the direct take-off pitch and then to the normal autorotational value upon disconnection of the drive.

7. In an aircraft sustaining rotor, a blade mounted for pitch change movement, and a mechanism for controlling pitch change movement including a fluid pressure piston and cylinder device having a passage for fluid flow to and from the cylinder, and means controlling the rate of flow in said passage providing for different rates of flow in different relative positions of the piston and cylinder.

8. In an aircraft sustaining rotor, a blade mounted for pitch change movement, and a mechanism for controlling pitch change movement including a fluid pressure piston and cylinder device having a passage for fluid flow to and from the cylinder, and means controlling the rate of flow in said passage providing for different rates of flow in different relative positions of the piston and cylinder, the last means including an orifice in the passage and a metering pin movable in said orifice in timed relation to the relative movement of the piston and cylinder.

9. In an aircraft sustaining rotor, a blade mounted for pitch change movement, and a mechanism for controlling pitch change movement including a fluid pressure piston and cylinder device having a passage for fluid flow to and from the cylinder, and means controlling the rate of flow in said passage providing for different rates of flow in different relative positions of the piston and cylinder, the last means including an orifice in the passage and a metering pin connected with the piston and movable in said orifice.

10. In an aircraft, a hub, a sustaining blade, cooperating parts for connecting the blade to the hub with freedom for pitch change movement, and a mechanism for controlling pitch change movement of the blade including a fluid pressure cylinder and piston device, the cylinder being connected with one of said parts and the piston with the other and providing for pitch change movement of the blade in accordance with the relative position of the cylinder and piston, and fluid supply and exhaust means for said cylinder including a timing device providing for different rates of fluid flow in different relative positions of the piston and cylinder.

11. In an aircraft, a hub, a sustaining blade, cooperating parts for connecting the blade to the hub with freedom for pitch change movement, and a mechanism for controlling pitch change movement of the blade including a fluid pressure cylinder and piston device, the cylinder being connected with one of said parts and the piston with the other and providing for pitch change movement of the blade in accordance with the relative position of the cylinder and piston, and fluid supply and exhaust means for said cylinder including a cooperating timing pin and orifice, one associated with the piston and the other associated with the cylinder, the pin being adapted to materially restrict flow through the orifice during one portion of one stroke of the piston in the cylinder as compared with another portion of said stroke.

12. In an aircraft, a hub, a sustaining blade, cooperating parts for connecting the blade to the hub with freedom for pitch change movement, and a mechanism for controlling pitch change movement of the blade including a fluid pressure cylinder and piston device, the cylinder being connected with one of said parts and the piston with the other and providing for pitch change movement of the blade in accordance with the relative position of the cylinder and piston, and fluid supply and exhaust means for said cylinder including cooperating timing orifice and pin elements one associated with the piston and the other associated with the cylinder, the pin being adapted to materially restrict flow through the orifice during movement of the piston corresponding to blade pitch movement from a lower to a higher pitch position.

13. In an aircraft, a hub, a sustaining blade, cooperating parts for connecting the blade to the hub with freedom for pitch change movement, and a mechanism for controlling pitch change movement of the blade including a fluid pressure cylinder and piston device, the cylinder being connected with one of said parts and piston with the other and providing for pitch change movement of the blade from a low pitch position to a high pitch position and then to an intermediate pitch position upon movement of the piston in the cylinder in one direction, and fluid pressure supply and exhaust means for the cylinder providing for different rates of flow of fluid during the movement of the piston in said one direction.

14. In an aircraft, a hub, a sustaining blade, cooperating parts for connecting the blade to the hub with freedom for pitch change movement, and a mechanism for controlling pitch change movement of the blade including a fluid pressure cylinder and piston device, the cylinder being connected with one of said parts and piston with the other and providing for pitch change movement of the blade from a low pitch position to a high pitch position and then to an intermediate pitch position upon movement of the piston in the cylinder in one direction, and fluid pressure supply and exhaust means for the cylinder providing for relatively rapid fluid flow during an initial portion of the stroke of the piston in said one direction and for relatively restricted flow during the portion of the stroke of said piston corresponding to the high pitch position of the blade.

15. In an aircraft, a hub, a sustaining blade, cooperating parts for connecting the blade to the hub with freedom for pitch change movement, and a mechanism for controlling pitch change movement of the blade including a fluid pressure cylinder and piston device, the cylinder being connected with one of said parts and piston with the other and providing for pitch change movement of the blade from a low pitch position to a high pitch position and then to an intermediate pitch position upon movement of the piston in the cylinder in one direction, fluid pressure supply and exhaust means for the cylinder providing for relatively rapid fluid flow during an initial portion of the stroke of the piston in said one direction and for relatively restricted flow during the portion of the stroke of said piston corresponding to the high pitch position of the blade and for relatively rapid fluid flow in the portion of the stroke of the piston corresponding to movement of the blade from the high pitch to the intermediate pitch position.

16. In a blade mounting for an aircraft sustaining rotor, a pair of mounting parts providing freedom for pitch change movement of the blade substantially about its longitudinal axis, fluid pressure piston and cylinder elements associated, respectively, with said parts, one being connected with its associated part by means of a cam device providing for relative rotation of said parts to change the blade pitch in accordance with relative movement of the piston and cylinder, and fluid pressure supply and exhaust means for the cylinder for controlling the relative position thereof and thus the pitch of the blade.

17. In a blade mounting for an aircraft sustaining rotor, a pair of mounting parts providing freedom for pitch change movement of the blade substantially about its longitudinal axis, fluid pressure piston and cylinder elements associated, respectively, with said parts, one being connected with its associated part by means of a cam device providing for relative rotation of said parts to change the blade pitch in accordance with relative movement of the piston and cylinder, the cam device being configured to provide for substantially zero pitch toward one end of the piston stroke, for higher than normal autorotational pitch at an intermediate point in the stroke and for autorotational pitch toward the other end of the piston stroke, means for moving the piston toward the autorotational pitch position, and fluid pressure supply and exhaust means for the cylinder including a fluid metering device for varying the rate of flow during different portions of the stroke of the piston under the influence of means for moving it toward autorotational pitch position.

18. A mounting for a normally autorotationally actuable sustaining rotor blade including cooperating mounting parts for the blade providing freedom for pitch change movement thereof substantially about the longitudinal axis of the blade, cam and cam follower elements, one associated with the blade and the other carried by a part movable axially of the blade, the cam and follower providing for pitch change movement of the blade upon axially inward movement of said part from substantially zero pitch to higher than normal autorotational pitch and then to substantially normal autorotational pitch, a fluid pressure cylinder and piston device for controlling axial movement of said part arranged to move the blade to substantially zero pitch position upon admission of fluid to the cylinder, means for moving the piston in the opposite sense to exhaust fluid from the cylinder, and a timing device controlling said exhaust.

19. A mounting for a normally autorotationally actuable sustaining rotor blade including cooperating mounting parts for the blade providing freedom for pitch change movement thereof substantially about the longitudinal axis of the blade, cam and cam follower elements one associated with the blade and the other carried by a part movable axially of the blade, the cam and follower providing for pitch change movement of the blade upon axially inward movement of said part from substantially zero pitch to higher than normal autorotational pitch and then to substantially normal autorotational pitch, a fluid pressure cylinder and piston device for controlling axial movement of said part arranged to move the blade to substantially zero pitch position upon admission of fluid to the cylinder, means for moving the piston in the opposite sense to exhaust fluid from the cylinder, and a timing device controlling said exhaust providing for relatively rapid exhaust during movement of the blade from substantially zero pitch position to the higher than normal pitch position and for relatively restricted exhaust when the blade reaches higher than normal pitch position.

20. A mounting for a normally autorotationally actuable sustaining rotor blade including cooperating mounting parts for the blade providing freedom for pitch change movement thereof substantially about the longitudinal axis of the blade, cam and cam follower elements, one associated with the blade and the other carried by a part movable axially of the blade, the cam and follower providing for pitch change movement of the blade upon axially inward movement of said part from substantially zero pitch to higher than normal autorotational pitch and then to substantially normal autorotational pitch, a fluid pressure cylinder and piston device for controlling axial movement of said part arranged to move the blade to substantially zero pitch position upon admission of fluid to the cylinder, means for moving the piston in the opposite sense to exhaust fluid from the cylinder, and a timing device controlling said exhaust providing for relatively restricted exhaust from the cylinder when the blade is in higher than normal pitch position and for relatively rapid exhaust during movement of the blade from higher than normal pitch position down to the substantially normal pitch position.

21. A mounting for a normally autorotationally actuable sustaining rotor blade including cooperating mounting parts for the blade providing freedom for pitch change movement thereof substantially about the longitudinal axis of the blade, cam and cam follower elements, one associated with the blade and the other carried by a part movable axially of the blade, the cam follower providing for pitch change movement of the blade upon axially inward movement of said part from substantially zero pitch to higher than normay autorotational pitch and then to substantially normal autorotational pitch, a fluid pressure cylinder and piston device for controlling axial movement of said part arranged to move the blade to substantially zero pitch position upon admission of fluid to the cylinder, and means normally urging the piston in the opposite sense including two devices either one of which is sufficient during normal flight to maintain the piston in the position corresponding to autorotational flight incidence of the blade but only one of which is sufficient to move the piston from the position corresponding to zero incidence toward the position corresponding to high pitch, whereby, in the event of failure of either during normal flight, the desired autorotational pitch setting of the blade is assured and whereby, upon failure of the stronger of said two means, movement of the piston from the position corresponding to zero pitch to a position corresponding to higher pitch is prevented.

22. A mounting for a normally autorotationally actuable sustaining rotor blade including cooperating mounting parts for the blade providing freedom for pitch change movement thereof substantially about the longitudinal axis of the blade, cam and cam follower elements, one associated with the blade and the other carried by a part movable axially of the blade, the cam and follower providing for pitch change movement of the blade upon axially inward movement of said part from substantially zero pitch to higher than normal autorotational pitch and then to substantially normal autorotational pitch, a fluid pressure cylinder and piston device for controlling axial movement of said part arranged to move the blade to substantially zero pitch position upon admission of fluid to the cylinder, a fluid pressure mechanism for moving the piston in the opposite sense, a timing device for controlling exhaust from said cylinder, and control means for alternatively delivering fluid pressure to said cylinder and to said mechanism.

23. In an aircraft having a normally autorotationally actuable sustaining rotor, a rotor blade mounted for pitch change movement between a position of substantially zero pitch and a position higher than normal autorotational pitch, means for driving the rotor including a control organ for connecting and disconnecting the drive, fluid pressure piston and cylinder elements for controlling blade pitch change and providing for pitch change movement of the blade from substantially zero pitch to a higher than normal autorotational pitch and then to an intermediate autorotational value during movement of the piston into the cylinder, valve means controlling delivery of fluid pressure to the cylinder, and means interrelating the operation of said valve means and the control organ for the rotor drive.

24. In an aircraft having a normally autorotationally actuable sustaining rotor, a rotor blade mounted for pitch change movement between a position of substantially zero pitch and a position greater than normal autorotational pitch, means for driving the rotor including a control organ for connecting and disconnecting the drive, fluid pressure piston and cylinder elements for controlling blade pitch change and providing for pitch change movement of the blade from substantially zero pitch to a higher than normal autorotational pitch and then to an intermediate autorotational value during movement of the piston into the cylinder, valve means controlling delivery of fluid pressure to the cylinder, and means interrelating the operation of said valve means and the control organ for the rotor drive and providing for exhaust of fluid pressure from the cylinder upon movement of the control organ to disconnect the rotor drive.

25. A mounting for a normally autorotationally actuable sustaining rotor blade including cooperating mounting parts for the blade providing freedom for pitch change movement thereof substantially about the longitudinal axis of the blade, cam and cam follower elements, one associated with the blade and the other carried by a part movable axially of the blade, the cam and follower providing for pitch change movement of the blade upon axial movement of said part from substantially zero pitch to higher than normal autorotational pitch and then to substantially normal autorotational pitch.

AGNEW E. LARSEN.